R. T. PISCICELLI.
CALCULATING MACHINE.
APPLICATION FILED APR. 25, 1912.

1,416,974.

Patented May 23, 1922.
10 SHEETS—SHEET 1.

WITNESSES:

INVENTOR
Roberto Taeggi Piscicelli
BY
ATTORNEYS

R. T. PISCICELLI.
CALCULATING MACHINE.
APPLICATION FILED APR. 25, 1912.

1,416,974.

Patented May 23, 1922.
10 SHEETS—SHEET 2.

WITNESSES

INVENTOR
Roberto Taeggi Piscicelli
BY
ATTORNEYS

R. T. PISCICELLI.
CALCULATING MACHINE.
APPLICATION FILED APR. 25, 1912.

1,416,974.

Patented May 23, 1922.
10 SHEETS—SHEET 3.

WITNESSES:

INVENTOR
Roberto Taeggi Piscicelli
BY

ATTORNEYS

R. T. PISCICELLI.
CALCULATING MACHINE.
APPLICATION FILED APR. 25, 1912.

1,416,974.

Patented May 23, 1922.
10 SHEETS—SHEET 5.

WITNESSES:

INVENTOR
Roberto Taeggi Piscicelli
BY
ATTORNEYS

R. T. PISCICELLI.
CALCULATING MACHINE.
APPLICATION FILED APR. 25, 1912.

1,416,974.

Patented May 23, 1922.
10 SHEETS—SHEET 6.

WITNESSES:

INVENTOR
Roberto Taeggi Piscicelli
BY
ATTORNEYS

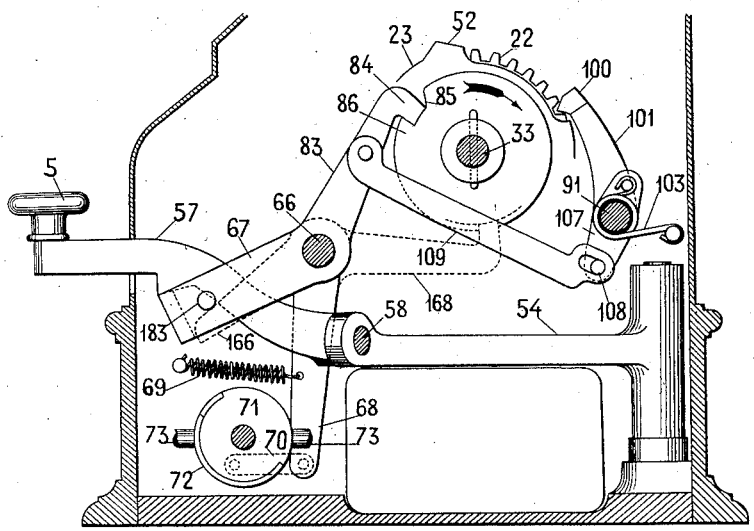
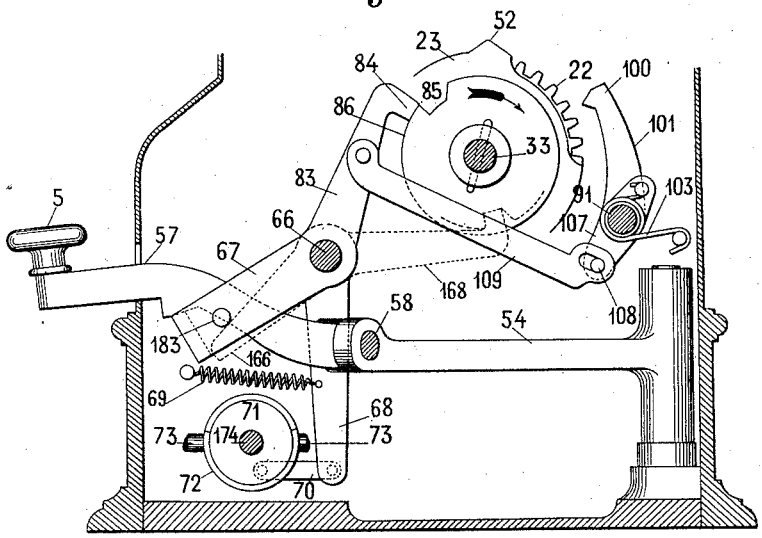

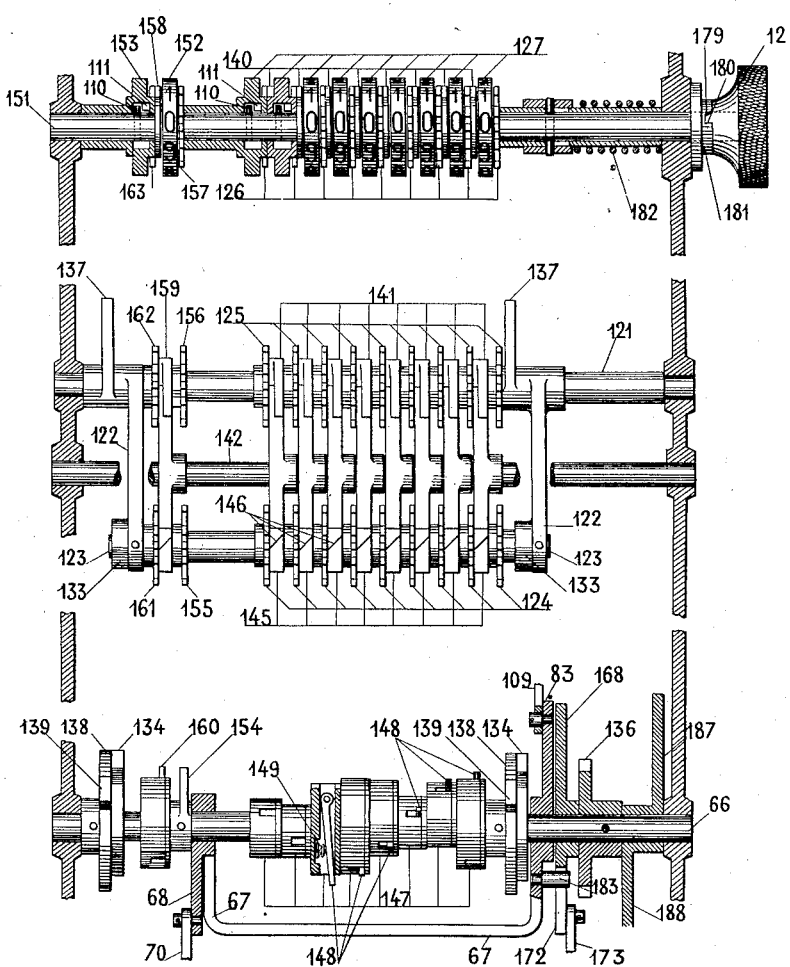

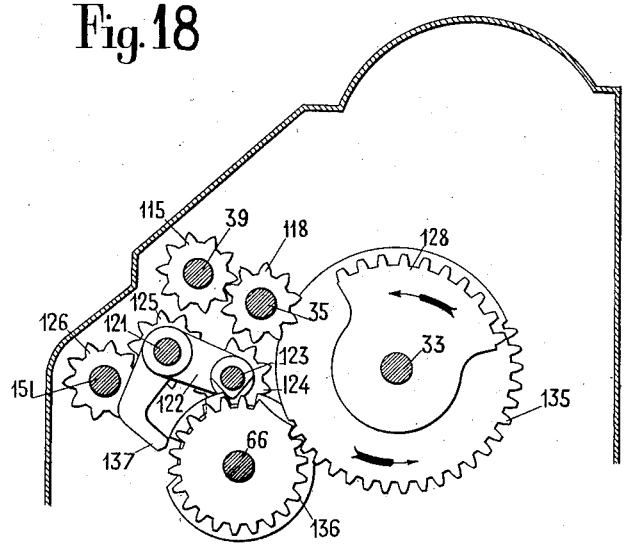
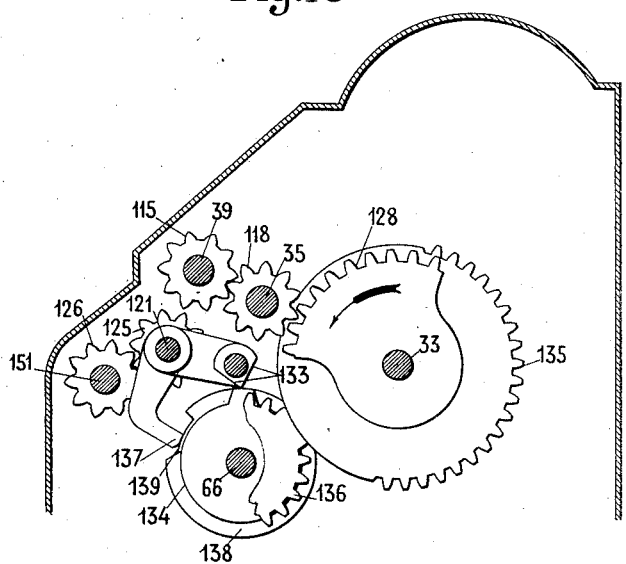

R. T. PISCICELLI.
CALCULATING MACHINE.
APPLICATION FILED APR. 25, 1912.

1,416,974.

Patented May 23, 1922.
10 SHEETS—SHEET 10.

WITNESSES:

INVENTOR
Roberto Taeggi Piscicelli
BY
ATTORNEYS

UNITED STATES PATENT OFFICE.

ROBERTO TAEGGI PISCICELLI, OF PARIS, FRANCE.

CALCULATING MACHINE.

1,416,974.   Specification of Letters Patent.   Patented May 23, 1922.

Application filed April 25, 1912. Serial No. 693,047.

(GRANTED UNDER THE PROVISIONS OF THE ACT OF MARCH 3, 1921, 41 STAT. L., 1313.)

*To all whom it may concern:*

Be it known that I, ROBERTO TAEGGI PISCICELLI, a subject of the King of Italy, residing at Paris, 6 rue de Hanovre, in the Republic of France, have invented certain new and useful Improvements in Calculating Machines, of which the following is a specification.

This invention relates to a multiplying and adding machine, the multiplication being made by repeated additions and the addition by adding the different products obtained, such machine comprising the following features:—

(*a*) The divers members are moved by means of an electric motor located within the machine itself;

(*b*) The totalizing discs remain fixed instead of being displaced with a carriage;

(*c*) The addition of the different products obtained is only effected at will after each product is forthcoming;

(*d*) The return to zero of the multiplicator and of the product indicator is automatically effected when adding each product obtained on the totalizing device.

The said machine is so arranged as to operate under the following conditions:—

The multiplicand, one of the factors, is placed by hand, by means of handles slidable in grooves on the upper part of the machine; the composition of the multiplicand appears at the same time on an indicator placed for that purpose.

The other factor, the multiplicator is then composed by moving laterally a handle, which hereinafter will be called the "multiplication handle," in a horizontal slit provided at the bottom of the casing of the machine and comprising slots wherein the said handle can be driven. The said slots correspond respectively with units, tens, hundreds, thousands, etc., of the multiplicator to be formed.

When the handle is driven into any one of the slots, the electric motor is started and moves the multiplicator disc bearing the corresponding number to the slot being made use of, until no further pressure is brought to bear on the multiplicator handle.

The handle is driven into the different slots until the multiplicator discs take the value of the desired multiplicator. If in any order of units there is a zero, the disc will not be lowered into the slot corresponding with such order.

The operation may be proceeded with by beginning with the figures of either the higher or lower order, or in any other suitable manner, provided that the value of the desired multiplicator can be read in the corresponding indicator.

The product is automatically formed as the multiplicator is being composed; hence, at each moment, the product shown always corresponds with the result of the multiplication inscribed in the multiplicand, by means of the handles, by the multiplicator legible for the time being.

If it be noticed that, by mistake, the value of the multiplicator inscribed is too small, the handle will again be placed in the slot corresponding to the figure to be increased, and the correction will be so made as to secure the right multiplicator.

In case the value of the multiplicator should be too high, it would be necessary to begin the operation again by turning to the extent of a complete revolution a button located on the side of the machine.

When there is no further doubt about the operation being the right one, the value of the product can be transferred on to a special totalizator by depressing a key, which will hereinafter be called the "totalization key"; the motor will be started in a direction inverse to the previous one and such motion will bring about the automatic disappearance of the multiplicator and the product of the respective indicators, while at the same time such product will be added to the special totalizator and a counter of products, located near the totalizator, will indicate one unit more than previously.

The successive operations will be produced in the same manner; the counter will indicate the number of the totalized products and the totalizator will give the sum of the products obtained.

The return of the totalizator to zero takes place at the same time as that of the counter, by means of another button located at one side of the machine.

The accompanying drawings show by way of example an embodiment of this invention wherein five figures are allowed at the multiplicand or the multiplicator, eight figures at the product, nine figures at the totalizator, and two figures at the counter of the totalized products.

Figure 10:
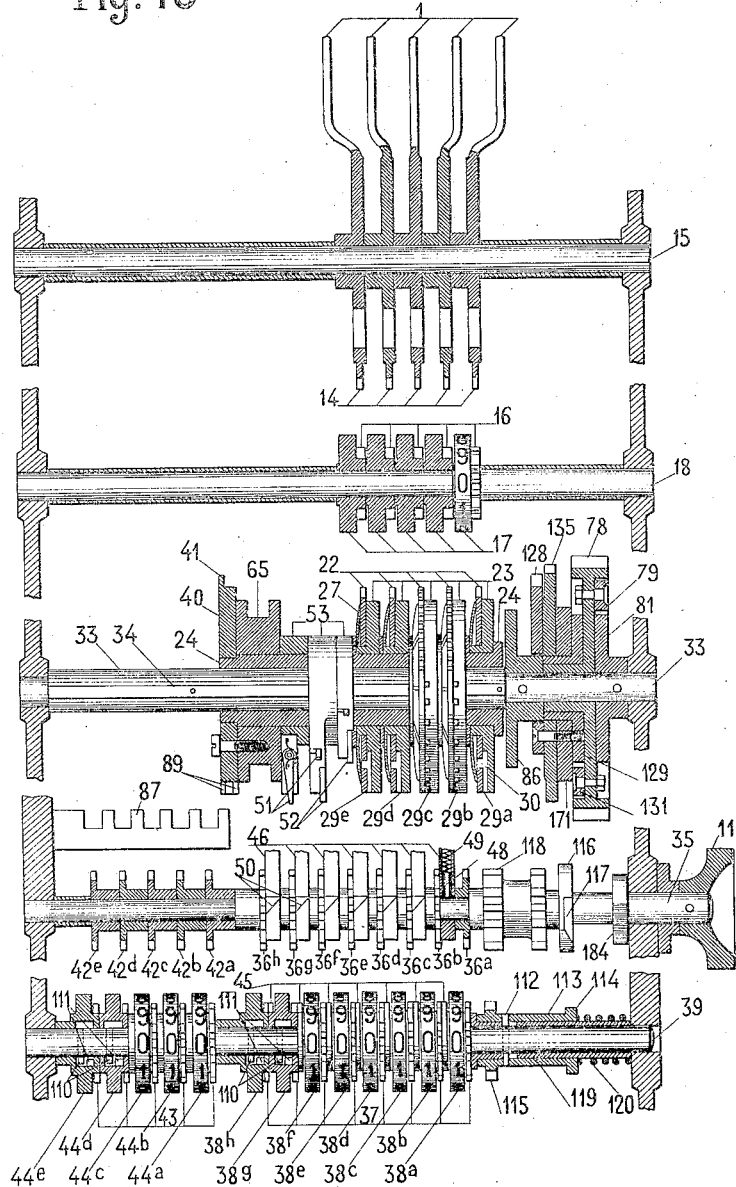

Figure 10 is a plan view showing the development of a section through the axis of the shafts of the multiplicand levers, of the multiplicand indicators, of the repeating drums, of the indicators of the multiplicator and of the product, of the members intermediate between the repeating drums and the indicators of the multiplicator and of the product. It must be noticed that, in such development, for greater clearness, the axes are moved away from one another in such a manner that the meshing gear wheels are not shown in contact with one another.

Figure 11:
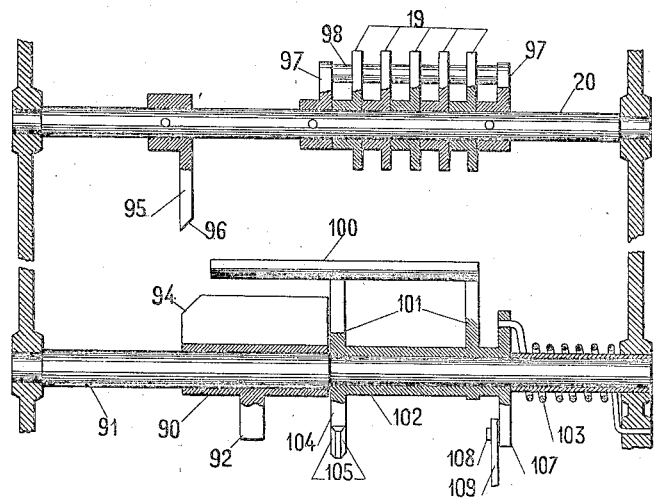

Figure 11 shows the development of a section through both the axes on which are mounted a device for blocking the multiplicand levers and a device for correcting the issue of the teeth on the repeating drums.

Figure 12:
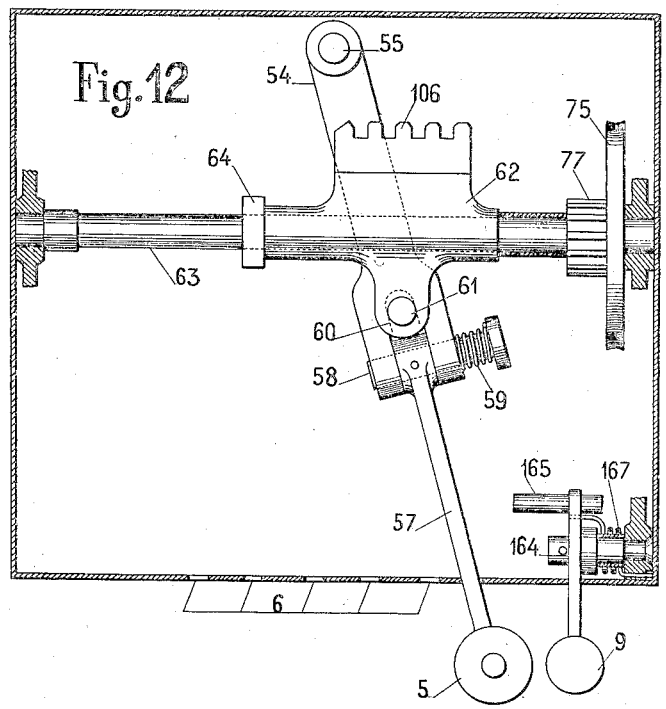

Figure 12 shows in plan the multiplication handle and the totalization key.

Figure 13:
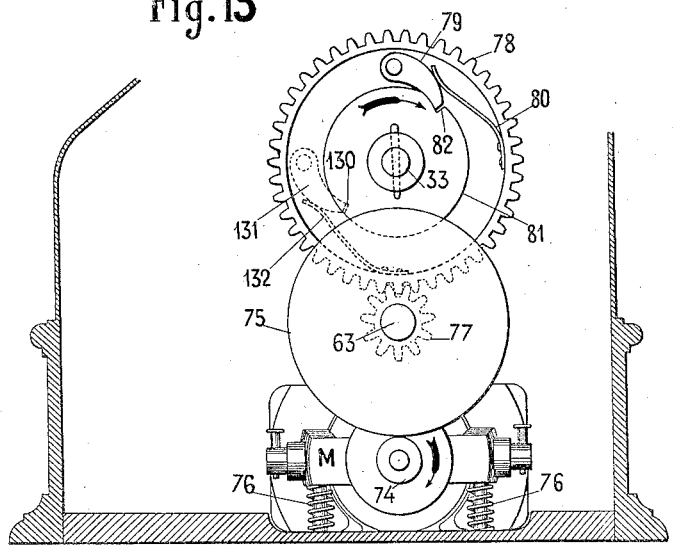

Figure 13 shows the transmission of the motion produced by the motor.

Figure 14:
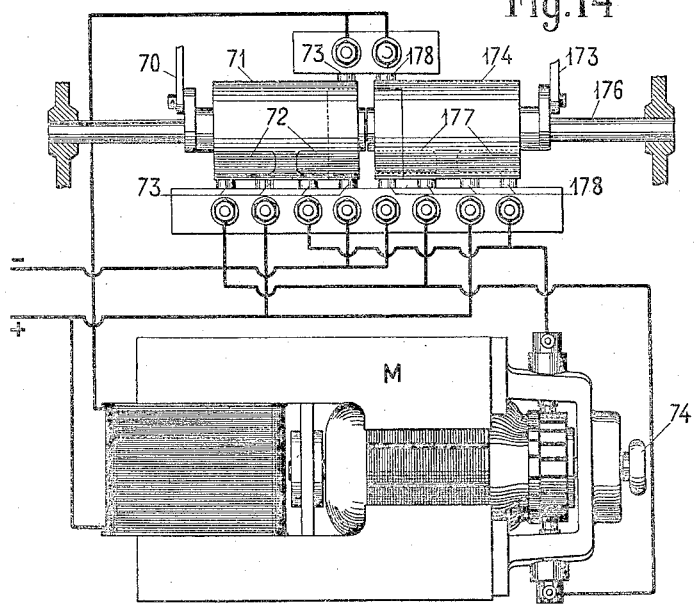

Figure 14 is a diagram of the electric connections for the forward and backward running of the motor.

Figure 15 shows the mechanism for starting the repeating drums, the latter being shown in the position of rest.

Figure 16 shows the same mechanism as Figure 15, during the rotation of the repeating drums.

Figure 17 shows in plan the development of a section through the axes of the indicator of the totalized products and of the intermediate wheels connected therewith, including the axis supporting the movable teeth for passing the tens into the indicator of the totalized products.

Figure 18 shows a vertical section of the mechanism, in the position of rest, for causing the return to zero of the indicators of the multiplicator and of the product, and for the totalization of the products on the indicator of the totalized products.

Figure 19 shows the same mechanism as Figure 18, during the movement of the members.

Figure 20:
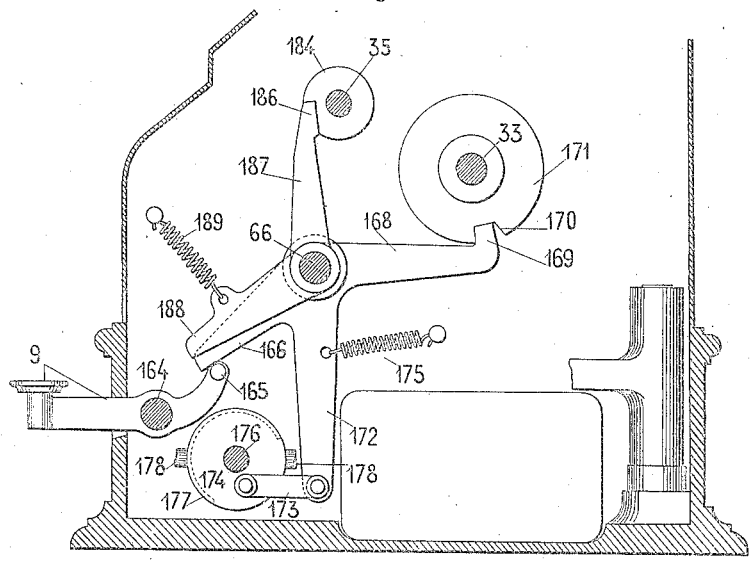
Figure 21:
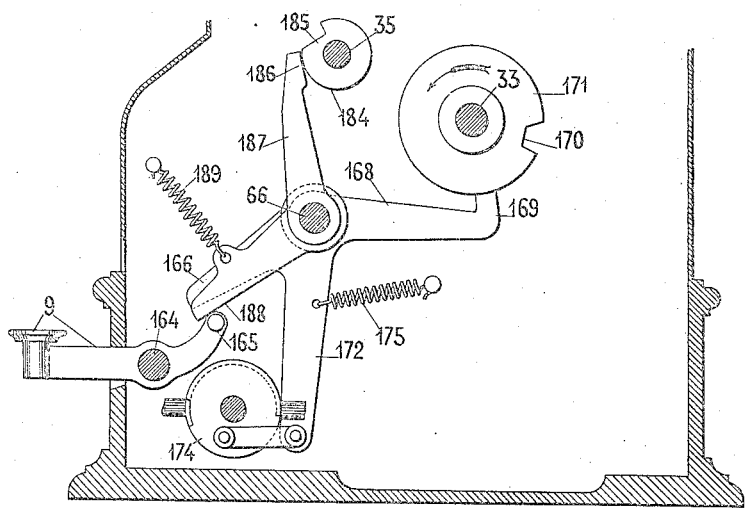

Figure 20 shows a vertical section of the mechanism controlled by the totalization key, such mechanism being in its position of rest; and Figure 21 shows the same mechanism as Figure 20, during the movement of the members.

Figure 1:
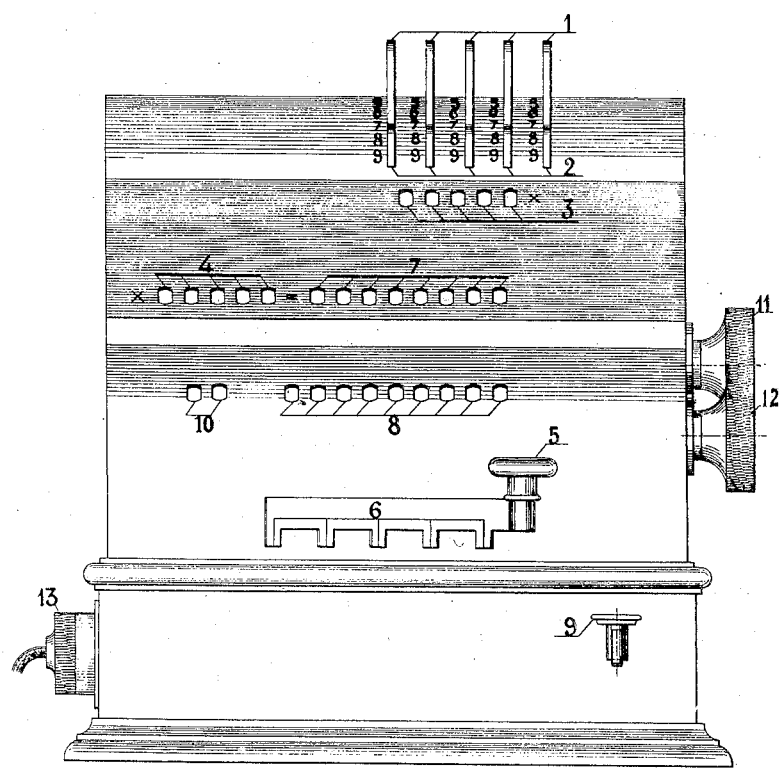
Figure 1 is a front view of the machine, as seen from the operator's side.

As shown in Figure 1, the machine is provided at the upper part with a series of five handles which will be called the "multiplicand handles", slidable in grooves 2 of the casing of the machine. Close to each groove is shown the series of figures from zero to nine.

Lower down the machine is provided with a row of windows 3 through each of which can be read the figure corresponding to the position of the respective handle. The indicator located behind the windows 3 will be called the "multiplicand indicator".

Still further down there is another row of windows 4, through which appear the different figures of the multiplicator as the machine is set to work by moving the button 5 of the multiplication handle and by thrusting such handle into the different slots 6; such indicator will be called the "multiplicator indicator."

To the right of the windows 4, and on the same line, are the windows 7, through which appear the figures of the product at the same time as are being formed those of the multiplicator; the indicator located behind the windows 7 will be called the "product indicator."

Still further down again can be seen another row of windows 8, through which appears the total of the products when the totalization key 9 is depressed; the series of discs giving the total of the products will be called the "totalizer of the products."

To the left and on the same line as the windows 8, lie the windows 10, through which can be read the number of the totalized products; the indicator located behind such windows will be called the "numberer of the totalized products."

The button 11 serves to return to zero by hand the indicator of the multiplicator and the indicator of the product, when a product obtained at the product totalizator is not to be added.

Another button 12 serves to return to zero the totalizator of the product and numberer of the totalized products.

On the left side of the base of the machine is arranged the current intake 13.

*Multiplicand.*—Each handle of the multiplicand 1 (see Figures 2 and 10) is integral with a wheel 14 provided with teeth on a part of its periphery. Such wheels revolve on the axis 15 and mesh with the wheels 16 having ten teeth, integral with the discs 17 of the multiplicand indicator. Each disc 17 is ciphered from zero to nine and revolves on the axis 18.

The exact position of the wheels 14 is ensured by means of pawls 19 (see Figures 2, 3, 9 and 11), revolving on the axis 20 and controlled by the springs 21.

Figure 5:
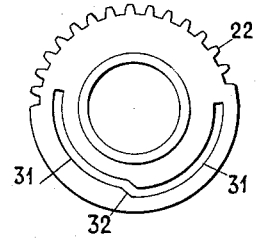
Figure 6:
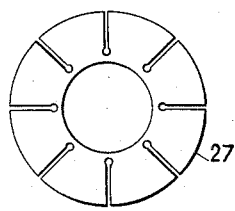
Figures 7, 8:
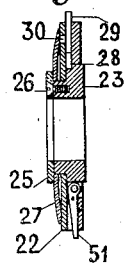
Figure 9:
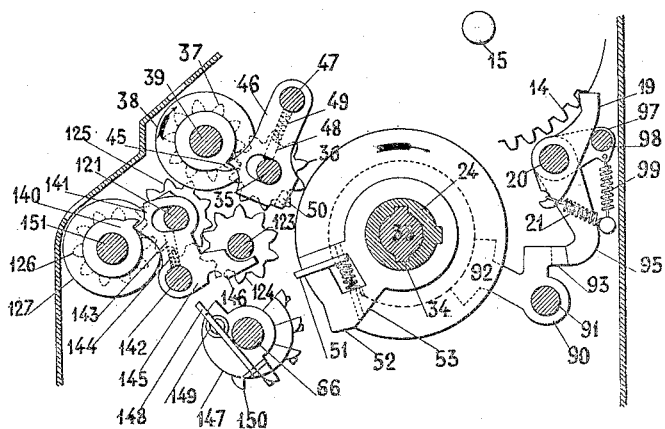
Figure 9 shows particularly the members for the passing of the tens to the indicator discs of the product and to those of the totalized products.

The said wheels 14 mesh with the toothed part of discs 22 (see Figures 2, 5 and 10) forming a part of movable toothed drums, which will be called "repeating drums."

*Repeating drums.*—Each drum (see Figures 4, 5, 6, 7, 8, 10) comprises a disc 23 fixed on a tube 24 and one of the discs 22 which revolves loosely on the disc 23. A washer 25, secured by means of a screw (26) to the part 23 of the drum, prevents the piece 22 from moving out. A flat spring 27, interposed between the parts 22 and 25, produces between the parts 22 and 23, sufficient friction to enable the disc 23 to carry the disc 22 forward with it in its rotation.

Each disc 23 is provided with nine radial grooves 28, in each of which is slidable a pin 29, which will be called a "value tooth."

Each value tooth carries a projection 30, housed in a groove 31 provided on the disc 22; each of such groove (see Figures 2 and 5) has two arcs of a circle of different radii united at the middle by an inclined part 32.

The tube 24 is slidable on the axis 33, which carries the said tube forward with it in its rotation by means of keys 34.

In the position of rest of the machine, the disc 23 being fixed and the disc 22 being engaged with the corresponding wheel 14, if the handle of the multiplicand 1 is displaced, there will issue from the periphery of the disc 23 a number of teeth having a value equal to the figure read on the multiplicand indicator.

On the tube 24 are fixed five repeating drums; in the position of rest of the machine, each disc 22 meshes with a wheel 14.

In starting from the right, the first repeating drum serves for the units, the second one for the tens, the third one for the hundreds, and so on.

The value teeth will be designated by $29^a$, $29^b$, $29^c$, $29^d$, $29^e$, according to the unit, ten or other drum to which they may belong.

*Product indicator.*—On another axis 35, parallel with the axis 33, are arranged eight wheels having ten teeth $36^a$, $36^b$, $36^c$, $36^d$, $36^e$, $36^f$, $36^g$, $36^h$, spaced from each other to the same extent as the repeating drums, so that, on the latter being moved towards the left, the value teeth of the drums will be enabled to engage the wheels 36.

All is so arranged that, when the value teeth are in the plane of the wheels 36, the discs 22 are in the planes intermediate between those of the wheels 14. Hence they will not mesh with such wheels when the series of repeating drums are set in motion.

Each wheel 36 meshes with another wheel having ten teeth 37 associated with one of the discs $38^a$, $38^b$, $38^c$, $38^d$, $38^e$, $38^f$, $38^g$, $38^h$, of the product indicator, which revolve on the axis 39.

*Multiplicator indicator.*—On the tube 24 is fixed another disc 40, having on its periphery a tooth 41, and on the axis 35 are again arranged five wheels $42^a$, $42^b$, $42^c$, $42^d$, $42^e$ having ten teeth, spaced apart at the same distance as the wheels 36.

Each wheel 42 meshes with a wheel 43, which is associated with one of the discs $44^a$, $44^b$, $44^c$, $44^d$, $44^e$, of the multiplicator indicator and which revolves on the axis 39. All is so arranged that when the value teeth $29^a$ of the first repeating drum on the right mesh with the first wheel $36^a$, the tooth 41 will mesh with the wheel $42^a$.

When the series of repeating drums is moved to the left and the value teeth $29^a$ of the first drum mesh with the second wheel $36^b$, the tooth 41 will mesh with the second wheel $42^b$, and so on.

It will be understood that during the rotation of the repeating drums, the tooth 41 of the disk 40 acting through the wheels 42 and 43 moves the disks 44, thus setting up the figures of the multiplicator indicator.

*The obtaining of a product.*—That being so, if it is desired to make a product, in the first place the series of repeating drums must be transferred to a position on the extreme right by means of the multiplication handle hereinafter described, in such a manner that the five discs of such drums will mesh with the five wheels 14. In the second place, the said wheels 14 will be turned by means of the handles 1 of the multiplicand, so as to form on the five discs 17 the value of the multiplicand, which at the same time will give rise to the appearance on the periphery of each repeating drum of a number of teeth having a value equal to each figure which will show itself on the corresponding disc of the multiplicand indicator.

Afterwards, the series of repeating drums will be moved to the left until the value teeth $29^a$ of the first drum come into the meshing plane of the wheel $36^a$, whereby the teeth $29^b$ of the second drum will come into the plane of the wheel $36^b$, the teeth $29^c$ into the plane of the wheel $36^c$, and so on, while the tooth 41 will be brought into the meshing plane of the wheel $42^a$.

After having thus determined the position of the repeating drums, the indicators of the multiplicand and of the product being at zero, if the series of repeating drums are turned a certain number of times by means which will be hereinafter described, it is obvious that the multiplicand will have been repeated on the product indicator a number of times equal to the figure which appeared on the disc 44ª, belonging to the units of the multiplicator. However, in order that the result may be correctly indicated by the indicator of the product, the intervention of a device for passing the tens will of course be necessary; such device will be described further on.

If the repeating drums are now so moved that the value teeth 29ª of the first drum will lie in the meshing plane of the wheel 36ᵇ, the teeth 29ᵇ of the second drum will come into the plane of the wheel 36ᶜ, the teeth 29ᶜ into the plane of the wheel 36ᵈ, and so on, while the tooth 41 will lie in the plane of the wheel 42ᵇ.

In this fresh position of the repeating drums, there will be given to the latter in a manner to be described further on, a rotary motion which, at each revolution, will add on the product indicator the value of the multiplicand multiplied by ten, as the series of drums have been moved one row to the left. And the disc 44ᵇ, counting the number of the revolutions of the repeating drums, will mark the figure corresponding to the tens of the multiplicator.

In operating in the same manner, that is in moving the repeating drums a further row to the left so that the value teeth 29ª will mesh with the wheel 36ᶜ, and in turning the repeating drums, the multiplicand multiplied by ten, will be added to the product indicator a number of times equal to the figure indicated on the disc 44ᶜ, corresponding to the hundreds of the multiplicator.

If the multiplicator is formed of a greater number of figures, the operation will extend to each one after another, by always moving one row to the left the series of repeating drums, and in turning such drums in each of their fresh positions a number of times equal to the figure which is to appear in the corresponding row of the multiplicator.

So the product indicator will always indicate the produce of the multiplicand composed on the discs 17 by the multiplicator composed on the discs 44.

It will be understood that when a multiplicand handle is actuated to set up a figure on the multiplicand indicator, the wheel 14 acting on the corresponding disk 22 will cause to be projected from the disk 23 a number of value teeth which correspond to the value of the figure set up on the multiplicand indicator. When the repeating drums are moved so that the projected value teeth are brought into mesh with the wheel 36, by turning the repeating drums, the wheels 36 and 38 are turned and the product indicator is moved a sufficient distance to indicate a figure corresponding with the number of the projected value teeth. During this operation the disc 40 is also turned and the single tooth 41 of said disc acting through the wheels 42 and 43 turns the multiplicator indicator disc a sufficient distance to expose the next figure on said indicator. Thus each time the repeating drums are turned the multiplicand is repeated on the product indicator and the number of times of this repetition is indicated by the multiplicator indicator.

*Passage of the tens onto the product indicator.*—The hereinbefore mentioned device for passing the tens onto the product indicator is as follows (see Figures 9 and 10):—

Each disc 38 carries a wheel 45 having a single tooth; each time that a disc 38 revolving in the direction of the arrow passes from the position of nine to that of zero, such tooth pushes a rocker arm 46 revolving on a spindle 47, and takes it nearer to the repeating drum. Such rocker arm is then maintained in the latter position by a piston 48, urged by a spring 49.

On the side of the arm 46, opposite to the repeating drums, is arranged an inclined plane 50 which, in the downward movement of the arm 46, causes a rocker tooth 51; placed on each of the discs 23, to move laterally to the left during the rotation of the repeating drums; the said tooth then meshes with the wheel 36 which corresponds to the disc of the product indicator of an order immediately superior to that which has determined the displacement of the rocker arm 46.

A boss 52, placed on each of the repeating discs beyond the rocker tooth 51, then returns the rocker arm 46 to its initial position.

To accomplish the passage of the tens to the discs 38 of the extreme left of the product indicator, supplementary discs 53 each carrying a rocker tooth 51 and a boss 52, are provided on the tube 33.

*Displacement of the repeating drums.*— The displacement of the series of repeating drums is obtained by means of the multiplication handle (see Figures 2, 12, 15, 16) which is composed of a piece 54 horizontally revoluble on a vertical stud 55 secured to the base 56 of the machine, and of an arm hinged on the piece 54, by means of a pivot 58, and carrying the button 5. A spring 59 constantly urges the arm 57 upwards. The piece 54 is provided with a slideway 60 wherein is engaged a pivot 61 integral with a slide 62, slidable on the stud 63. Such slide supports a salient part 64, which is engaged in a circular groove provided in the rim of a disc 65, fixed on the tube 24, with the series of repeating drums. All is so arranged that in bringing the arm 57 opposite the slots 6 successively from right to left, the value teeth 29 will lie respectively in the plane of the wheels 36ª, 36ᵇ, 36ᶜ, etc.

*Control of the rotation of the drums.*—
We will now describe the control of the rotation of the repeating drums for the purpose of obtaining a product.

A piece in the shape of a yoke 67 is enabled to rock on a stud 66 (see Fig. 2), and on the said piece the arm 57 of the multiplication handle constantly bears, regardless of the transversal displacements.

The yoke 67 carries a vertical arm 68, on which acts a spring 69 tending to maintain the same constantly raised. To the end of the arm 68 is connected a link 70 which, each time the arm 57 is lowered, causes a cylinder 71, of insulating material, to turn to the extent of a certain angle. On the said drum are embedded two small metal plates 72 (see Figures 14, 15, 16); when such drum is turned or revolved, the plates 72 come in contact with the pistons 73 to close the circuit of the motor M (see Figure 13), which will then be caused to revolve in the direction of the arrow.

The axis of the motor carries a pulley 74, made of yielding material, which bears against a disc 75 revolving on the stud 63. The friction between the pulley 74 and the disc 75 is ensured by springs 76 which lift the motor around a swinging axis. A pinion 77 integral or associated with the disc 75 carries forward a wheel 78 loosely mounted on the axis 33. On the said wheel 78 is mounted a pawl 79 pressed by a spring 80; a disc 81, fixed on the axis 33, carries a slot 82, which is engaged by the pawl 79. By means of this device, the wheel 78 carries forward in its rotation the spindle 33, the tube 24 and the series of repeating drums.

Figures 2, 3:
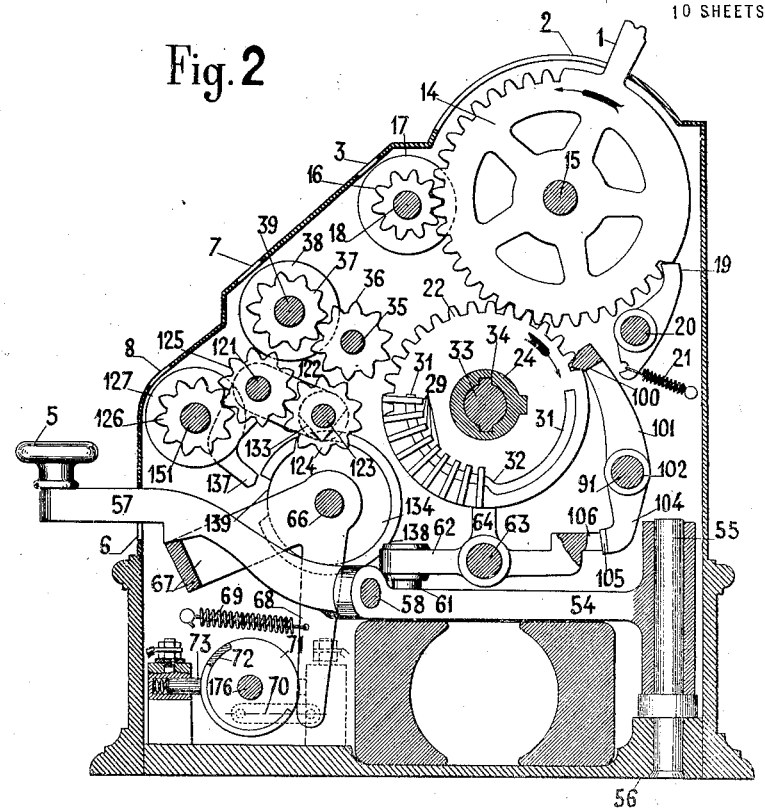
Figure 2 is a vertical section of the machine showing the mechanism moved by each of the handles whereby the multiplicand is made up, the general arrangement of the transmission of the values to the different indicator discs and the mechanisms connected therewith.
Figure 3 shows the transmission of the values to the repeating drums and the numberer of the totalized products, the device for conveying the repeating drums and the blocking of the handle wheels of the multiplicand.
Figure 4:
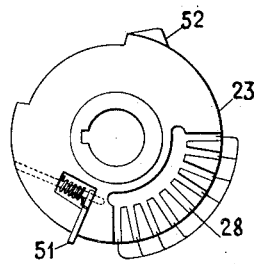
Figures 4, 5, 6, 7, 8 are detail views of the repeating drums.

*Stoppage of the drums.*—To ensure the stoppage of the repeating drums always exactly in their idle position, the yoke 67 carries a lever 83 having at its end a terminal pin 84 which, when the machine is in its idle position, enters a slot 85 provided on a disc 86 fixed on the spindle 33. On the multiplication handle being moved opposite one slot 6, and on the button 5 being depressed, the arm 57 is caused to descend in such slot 6 and determines at the same time the lowering of the yoke 67 and the removal of the pin 84 from its slot 82, whereupon the plates 72 come in contact with the pistons 73, thus giving rise to the rotation of the motor and hence the carrying forward of the repeating drums in the direction of the arrow (Fig. 2).

If at any time the arm 57 of the multiplication handle is allowed to move up, before the complete cycle of the operation is finished, the pin 84 will bear on the smooth surface of the disc 81 (Figure 16), forcing the yoke 67 to remain lowered.

Such being the conditions, the electric contact will be maintained until the slot 85 of the disc 86 comes in register with the pin 84 which, under the influence of the spring 69, will again engage therein, in stopping the rotation of the repeating drums and in cutting off at the same time the motor current.

*Devices ensuring the exact position of the members.*—We will now describe three devices, the first one being for the purpose of ensuring, during their rotation, the exact lateral position of the repeating drums, so as to obtain a perfect register with the wheels which are to mesh with the value teeth; the second one for the purpose of ensuring the blocking of the multiplicand handles and of the wheels 14, on the series of repeating drums being moved away from their position at the extreme right; the third one for the purpose of ensuring the alignment of the teeth carried by the discs 22 of the repeating drums and hence the clear issue of the value teeth.

The first of these devices consists in a comb 87 having five slots (see Figures 3 and 10), secured to the main frame of the machine; when the disc 40, in the rotation of the repeating drums, is housed in one of the slots of the comb 87, its finger 41 lies opposite one of the wheels 42 and hence the value teeth lie opposite the wheels 36. The disc 40 is provided with a notch 88 in which passes the comb 87 during the lateral displacements of the repeating drums. When the rotation of the series of repeating drums begins, and before any work has been done by the value teeth, the disc 40 will engage with one of the slots of the comb 87. Assuming that the position of the series of repeating drums is not exactly determined by the sole longitudinal displacement of the multiplication handle, two inclined planes 89, provided on one of the faces of the notch of the disc 40, will rectify, in entering the corresponding slot, the lateral position of the repeating drums. The disc 40, in continuing its rotation, will prevent such drums from moving longitudinally, before the revolution is finished and before the return of the notch 88 to its initial position. So this device determines the exact position of the repeating drums and prevents the operator from moving the multiplication handle during the rotation of the latter.

The second device (see Figures 3, 9, 11) comprises a slide 90 slidable along a stud 91 and carried forward by the series of repeating drums, by means of a projection 92 engaged in the circular groove of the disc 65. At the side opposite to the projection 92, the slide 90 terminates in a horizontal plate 93, the left end of which is provided with an inclined plane 94. An arm 95, integral with the stud or spindle 20, carries at one of its ends a bevel 96. When the series of repeating drums are in their position at the extreme right, with, of course, the piece 90 in the corresponding position, the inclined plane 94 of the side 90 will lie opposite the bevel 96 of the arm 95. On the same spindle 20 are secured two arms 97 connected together by a bar 98. The spring 99 acts in such a manner as to keep the bar 98 from the pawls 19. But, under the effect of the longitudinal displacement of the series of repeating drums to the left, the inclined plane 94 of the slide 90, meeting with the bevel 96 of the arm 95, will push the same, and the spindle 20, in pivoting, will bring the bar 98 against the pawls 19 of the wheels 14, which will thus be stopped, until the return of the series of repeating drums to their position at the extreme right.

The third device (see Figures 2, 11, 12, 15, 16) comprises a transversal bar 100 which can be housed in the gaps of the teeth of the discs 22. Such bar is integral with two arms 101 connected by a tube 102 revolving around the spindle 91. The bar 100 is constantly maintained against the discs 22 by the action of a spring 103. An extension 104 of one of the arms 101 terminates at its lower part in two inclined planes 105 which bear against a comb 106 integral with the piece 62. At the right side of the tube 102 is an arm 107 which is associated with the parts 100, 101, 102 and carries a pivot 108 to support a link 109 connecting it with the arm 83 integral with the yoke 67. One end of the link 109 is provided with a slide-way wherein is slidable the pivot 108, so that the transversal bar 100 can operate as a pawl when the discs 22 are made to turn by means of the multiplicand handles; but when the pin 84 moves out of its slot 85, the bar 100 will, under the action of the link 109, also have to move out of contact with the teeth of the discs 22.

In its idle position, the bar 100 rests on the teeth of the discs 22, but when the slide 62 is moved by means of the multiplication handle, the inclined planes 105, coming in contact with the comb 106 which has a bevel on its left end, compel the bar 100 to enter well into the gaps of the teeth of the discs 22, if, under the action of the spring 103, it has not already gone sufficiently down in such gaps. So this device ensures the perfect alignment of the teeth of the discs 22 and hence the clear issue of the value teeth.

In the different operative positions of the repeating drums, the arm 104 may enter into one of the slots of the comb 106, so that the bar 100, controlled by the link 109, will move sufficiently away from the repeating drums to allow of the latter turning freely with their value teeth and with the other salient parts of the same.

*Return to zero of the product indicator with the transfer of the product on the indicator of the totalized products.*—As hereinbefore stated, when the totalization key is depressed, the return to zero of the product indicator and of the multiplicator indicator is performed automatically, and at the same time the product is added on the indicator of the totalized products.

The spindle 39 (see Figure 10), on which are mounted the discs 44 of the multiplicator indicator and the discs 38 of the product indicator, carries a series of studs 110 arranged on the same line. Each of these studs is placed in a circular recess provided at the centre of each of the discs 38 and 44. Each of the wheels having ten teeth 37 and 43 associated with such discs, is provided with a pin 111 normally secured to such wheel and entering into the central recess of the corresponding discs 38 or 44.

Each pin 111 is placed opposite to the tooth which corresponds to the zero of the disc. The position of the spindle 39 is such that, when the machine is operating to form a product, the studs 110 let the discs revolve freely without the pins 111 meeting with the same, but, when the machine is not effecting a product, if the spindle is displaced a little to the right and then revolved once, the studs 110 meet with the pins 111 of the discs which do not lie at zero, and compel them to revolve until their return to the zero position.

To give to the spindle 39 the lateral displacement and the rotary motion, such spindle 39 is connected by means of a cotter 112 with a tube 113, carrying a disc 114 and a wheel 115. Again, on the spindle 35 are secured a cam 116, having a slot 117 with an inclined plane, and a gear wheel 118.

If the spindle 35 is turned, the plane of the slot of the cam 116 pushes the disc 114 away and compels the spindle 39 to move laterally, while the wheel 118, still meshing with the wheel 115, compels the said spindle to turn.

A spacing tube 119, housed in the tube 113, serves to maintain the discs of the indicators in the direction of their axis. A spring 120, bearing constantly against the tube 113, compels the spindle 39 to return to its first lateral position when its revolution is completed.

The rotation of the discs 38 and 44 in view of their return to zero, is, as will be seen further on, produced in a direction inverse, to that which was communicated to them for the purpose of taking the values; hence, the wheels 37 and 43, associated with the discs, will each turn to the extent of a number of teeth equal to the figure marked on each disc 38 or 44. The result is that if, on the return to zero, one can bring each disc of the indicator of the totalized products into mesh with the disc of the same order of the product indicator, there will be transferred onto the indicator of the totalized products the value of the product about to disappear from the product indicator. To accomplish this, on the spindle 121 (Figures 2, 10, 17, 18, 19) are pivoted two arms 122 connected by a spindle 123 on which are placed two wheels 124 having ten teeth, loosely mounted on the said spindle. The wheels 124 mesh with as many wheels 125 loosely mounted on the spindle 121, and the wheels 125, in their turn, mesh with as many wheels 126 having ten teeth, associated with the discs 127 of the indicator of the totalized products. During the operation of the machine for the formation of a product, the wheels 36 do not mesh with the wheels 124, and, consequently, the indicator of the totalized products remains idle. But if, after having made a product, the wheels 36 are brought into mesh with the wheels 124, and if a complete revolution is given to the spindle 39, it is obvious that there will be obtained the return to zero of the multiplicator indicator and of the product indicator, while the value of the product, about to disappear from the discs 38 of the product indicator, will be transferred onto the discs 127 of the indicator of the totalized products. This double operation will be accomplished by the following means:—

To make the spindle 39 turn to the extent of a revolution, all that need be done is to turn to the same extent the spindle 35, which will carry the spindle 39 forward with it by means of the wheels 115 and 118. For that purpose, the wheel 118, associated with the spindle 35, is carried forward by a toothed sector 128 loosely mounted on the hub of the wheel 78. To determine the rotation of the sector, the latter is associated with a disc 129, which is provided with a slot 130 (see Figure 13) in which engages a pawl 131 mounted on the wheel 78 and which is pushed against such disc by a spring 132. As the pawl 131 extends in a direction inverse to the pawl 79 acting on the disc 61, if the wheel 78 revolves in the direction of the arrow, it will carry forward, by means of the pawl 79, the disc 81 and, consequently, the series of repeating drums, while the pawl 131 will ride on the periphery of the disc 129 without carrying the latter forward and leaving the sector 128 idle. But if the wheel 78 revolves in the direction inverse to that of the arrow, the pawl 131 will carry forward the disc 129 and, consequently, the sector 128 will mesh with the wheel 118 and turn the spindles 35 and 39, in producing the return to zero of the discs 38 and 44. In this case, it is the pawl 79 which will ride on the disc 81, leaving the series of repeating drums idle.

It will be described later on how the motion of the motor and of the wheel 78 is reversed by depressing the totalization key. In the meantime we are going to see how the wheels 36 are brought into mesh with the wheels 124.

At the end of each arm 122 the boss which carries the spindle 123 is provided with an inclined plane 133; on the inclined planes 133 act two similar cams 134 fixed on the spindle 66. The contour of both the cams 134 is such that if the spindle 66 is caused to turn, the two arms 122 are raised and bring the wheels 124 into mesh with the wheels 36.

To cause the spindle 66 to turn, the wheel 135 toothed on a part of its periphery and associated with the disc 129, lies in the plane of another partly toothed wheel 136 fixed on the spindle 66 (see Figures 18 and 19).

On the totalization key being relieved of pressure, the motor begins to revolve in a direction inverse to that of the arrow (see Figure 13); the wheel 135 revolves in the direction of the arrow (see Figure 18) and causes the wheel 136 to revolve, only to the extent of a small angle as in the idle position, these wheels have only one tooth in mesh. Hence the spindle 66 turns slightly and both the cams 134 raise the arms 122, thus bringing into mesh the wheels 36 and 124. The wheel 135 continuing its rotation, the wheel 136 stops so long as the smooth parts of both the said wheels are in contact (see Figure 19). It is during this period that the toothed sector 128 comes into mesh with the wheel 118 and produces the rotation of the spindles 35 and 39, the return to zero of the multiplicator and product indicators, and the transfer of the product onto the indicator of the totalized products.

In continuing its rotation, the wheel 135 comes again into mesh with the wheel 136; both the cams 134 revolve and produce at once the lowering of the arms 122 so that the wheels 124 are moved away from the wheels 36 during the last part of the rotation of the wheel 135, during which is produced, as will be seen later on, the passage of the tens onto the discs of the indicator of the totalized products. To ensure the lowering of the arms 122 and consequently the putting out of gear of the wheels 36 and 124, the ends of both the arms 122 are made in the shape of lips 137 and bear on both the cams 134, both the lips 137 entering into the notches 139 of the cams 138; one of the sides of each notch is inclined and pushes the lip 137 onto the smooth periphery of the corresponding cam 138, at the moment when the wheels 124 are put out of gear with the wheels 36.

*Transfer of the tens onto the indicator of the totalized products*—For the totalization of the products as well as for the inscription of the products on the wheels 38, the machine is provided with a suitable device for passing the tens of each disc 127 onto the disc of the immediately superior order.

For this purpose, each disc 127 of the indicator of the totalized products carries a wheel 140 having a single tooth (see Figures 9 to 17). Each time that the discs 127 pass beyond the zero, such tooth displaces a swinging member 141 pivoted on the spindle 142. A piston 143, pressed by a spring 144, gives security to the fresh position taken up by the member 141. The latter is provided with an arm 145 which passes between two of the wheels 124 and which has an inclined plane 146. On the spindle 66 are fixed eight members 147 in each of which is mounted a tooth 148 which can move laterally. A spring 149 presses the tooth 148 to the right in such a manner that, if nothing intervenes during the rotation of the spindle 66, the said tooth will pass to the right of the corresponding wheel 124; when the arm 145 has been pushed back by the action of the wheel 140, the inclined plane 146 will have taken such a position that the movable tooth 148 will be moved to the left and, meeting with the wheel 124, will compel the latter to turn to the extent of one tooth. By means of one of the idle wheels 125, the movement will be transmitted to the disc 127, belonging to the order immediately superior to that of the disc which has determined the displacement of the swinging member 141. Bosses 150 associated with the members 147 raise the arms 145 when the teeth 148 have finished their work.

*Numberer of the totalized products.*—On the spindle 151 which carries the discs 127 of the indicator of the totalized products, are placed the two discs 152, 153 of the numberer of the totalized products. The disc 152 is that of the units and the disc 153 is that of the tens; they are controlled in the following manner (see Figures 3 and 17). On the spindle 66 is fixed a finger 154 which, at each revolution of the spindle, turns to the extent of one tooth a series of wheels 155, 156, 157 and consequently the disc 152 which is associated with the wheel 157. As each revolution of the spindle 66 corresponds to the totalization of a product, it is obvious that the disc 152 will mark one more unit at each totalized product.

The disc 152 is provided on its left side with a wheel having a single tooth 158 so placed that, each time that the disc 152 passes beyond the zero, a swinging member 159, similar to the members 141, will be pushed and will compel a movable tooth 160, arranged in the same way as the teeth 148, to turn to the extent of one tooth the wheels 161, 162 and 163, and consequently to the extent of one unit the disc 153 indicating the tens of the numberer of the totalized products.

*Control of the backward running of the motor.*—We will now describe how the lowering of the totalization key produces the running of the motor in a direction inverse to that given it by the multiplication handle, and how the stoppage of the machine is brought about, after the return to zero and the totalization of a product.

The totalization key (see Figures 12, 13, 14, 20, 21) pivoted on the spindle 164 is provided at its rear end with a pin 165 which, when the key 9 is depressed, acts underneath an arm 166 pivoted on the spindle 66. A spring 167 tends to maintain the key always raised. Two arms 168 and 172 are associated with the arm 166; the arm 168 terminates in a pin 169 which can engage a slot 170 provided on the periphery of a disc 171; the latter is associated with the disc 129 which, as hereinbefore mentioned, can be carried forward by the wheel 78 when the latter turns in a direction inverse to that of the arrow (see Figure 13). The arm 172 is connected by a link 173 with a cylinder 174 made of insulating material. A spring 175 attached to the arm 172 tends to maintain the pin 169 in the slot 170 and the arm 166 in contact with the pin 165 of the totalization key 9. The cylinder 174 turns on a spindle 176, on which also turns the cylinder 71; the cylinder 174 also carries two metal plates 177, which can come in contact with pistons 178 to close the circuit of the motor.

The diagram of the Figure 14 shows at M a continuous current motor energized in shunt; the wiring is such that the current never changes its direction in the indicator whether the circuit is established either by the cylinder 71 or by the cylinder 174, whereas the direction of the current in the armature changes according as to whether the circuit is closed either by the cylinder 71 or by the cylinder 174, which produces the change of the direction of the rotation of the motor.

Assuming now that the totalization key has been depressed, it will be seen that the pin 165 lifts the arm 166, while the pin 169 moves out of the slot 170 of the disc 171, and the arm 172, by means of the link 173, turns the cylinder 174 to the extent of the angle necessary to bring the plates 177 in contact with the pistons 178. The current will thus be sent to the motor and the wheel 72 will begin to turn in a direction inverse to that of the arrow (see Figure 13), carrying forward by means of the pawl 131 the disc 129 and also the disc 171, associated therewith.

During the rotation of the disc 171 (see Figure 21) if the totalization key 9 is relieved of pressure, it will be immediately raised under the action of the spring 167. But the pin 169 in riding on the smooth periphery of the disc 171, will keep the circuit closed until the time when the pin 169 meets with the slot 170 and enters therein in stopping the movement of rotation, the circuit of the motor being cut off at the same time.

*Return to zero by hand.*—When it is not desired to add a product obtained on the indicator of the totalized products, all that need be done is to turn the button 11 (see Figure 10) associated with the spindle 35; in this manner, one produces by hand the rotation of the spindle 39 and consequently the return to zero of the multiplicator and product indicators.

During such operation the spindle 66 remains idle and consequently the wheels 36 and 124 are not in gear during the return to zero.

The button 12 (see Figure 17) is fixed on the spindle 151 of the discs of the indicator of the totalized products and of the numberer of the totalized products.

The spindle is provided with studs 110 and the wheels 125 with pins 111, arranged in the same manner as for the multiplicator and product indicators.

In turning the button 12, an inclined plane 179 of the button, sliding in an inclined slot 180 of a cam 181, secured to the main frame of the machine, moves the spindle 151 to the right in bringing the studs 110 in contact with the pins 111. When the revolution is completed, a spring 182 returns the spindle to its idle position.

*Safety device.*—There now remains to be described two devices ensuring the operation of the machine.

The first one is for the purpose of preventing the lowering of the multiplication handle at the same time as that of the totalization key which would produce the simultaneous rotation of both the cylinders 71, 174 and consequently a short circuit.

The second one is for the purpose, firstly to lock the totalization key 9 when the button 11, on being turned by hand, does not take exactly its idle position; in such case, the sector 128 not meeting in a good position the wheel 118 fixed on the spindle 35 of the button 11, might block the machine or produce a bad result; and Secondly to compel the totalization key to rise immediately after the circuit is closed, thus preventing the numberer of the totalized products from being moved more than to the extent of a unit at each operation.

The first device comprises a pin 183 (see Figures 15, 16, 17) placed at the right side of the yoke 67. If the latter is lowered by the multiplication handle (see Figure 16), the pin 183 bears on the arm 166, and the pin 84 bearing on the smooth part of the disc 86 locks the arm 166 and hence prevents the pin 165 (see Figures 20, 21) from rising and the totalization key from lowering.

On the other hand, if the totalization key 9 is lowered, the pin 165 lifts the arm 166 (see Figure 15) and the pin 169 acting on the smooth part of the disk 171 (see Figure 21) prevents the fork 67 from lowering as the pin 183 is bearing on the arm 166. Consequently the arm 57 of the multiplication handle cannot then be lowered.

In case the multiplication handle and the totalization key should be lowered at the same time, these two members could not be brought beyond the half of their stroke and hence the two commutator cylinders would not close the circuits.

The last named device comprises a disc 184 (see Figures 20, 21) fixed on the spindle 35. In the idle position of the spindle, a slot 185 of the disc 184 receives the end 186 of an arm 187 pivoted on the spindle 66; another arm 188, associated with the arm 187, then lies away from the pin 165 of the totalization key and permits the latter to move. But if the spindle 35 is not exactly in the idle position, the end 186 of the arm 187 lies, under the action of the spring 189, in contact with the smooth part of the disc 184, and the arm 188 bearing on the pin 165 prevents the lowering of the totalization key, which prevents the blocking of the machine and avoids erroneous results.

The same disc 184, in turning during the return to zero, compels the totalization key to move up again immediately after the closure of the circuit. And indeed, when the disc 184 is exactly in the idle position, the end 186 of the arm 187 is housed in the slot 185 and the arm 188 is moved, away from the pin 165, thus permitting the totalization key to lower. As soon as the circuit is closed, the disc 184 turns and swings the arm 187 so that the arm 188 bears on the pin 165 and makes the totalization key move up at once.

Claims—

1. A multiplying machine operating by repeated additions comprising wheels having handles serving to set up the multiplicand and placed in fixed planes, product indicator wheels also placed in fixed planes, repeating drums, an electric motor, a multiplication handle movable in two cross-wise directions, and electric contacts actuated by the said handle when the later is moved in one of the two directions and adapted to supply current to the electric motor, the repeating drums being adapted to be moved in the direction of their axis by the handle when the latter is moved in the second direction so that they are brought into cooperation either with the wheels having handles or with the product indicator wheels, and the motor being adapted to revolve or turn the repeating drums.

2. In a multiplying machine operating by repeating additions the combination of two parallel horizontal spindles, a tube slidable on one of such spindles, repeating drums on such tube, a slide slidable on the second spindle, a fork on such slide adapted to carry the said tube forward, an arm swinging around a vertical spindle and adapted to carry the slide forward, and a handle pivoted by means of a horizontal spindle to such arm so as to carry the same forward when the said handle is moved laterally, whereby the repeating drums are correspondingly moved.

3. In a multiplying machine operating by repeated additions, the combination of a handle movable in two cross-wise directions, repeating drums, an electric motor adapted to revolve such drums, means for moving axially the said drums by moving the handle in one direction, and means for supplying current to the electric motor by moving the handle in the other direction.

4. In a multiplying machine by repeating additions, the combination of repeating drums, a handle movable around both a horizontal spindle and a vertical spindle, a yoke swinging around a horizontal spindle and having a part parallel to such spindle on which the handle is slidable, an electric motor adapted to revolve the repeating drums, and electric contacts actuated by the said yoke and adapted to supply current to the electric motor.

5. In a multiplying machine operating by repeated addition, the combination of repeating drums adapted to be moved axially, wheels having handles serving to inscribe the multiplicand on such drums and placed in fixed planes, dogs or detents acting on such wheels, a slide connected with the repeating drums, a swinging arm actuated by the displacement of such slide and a bar on such arm adapted to act on the dogs or detents of the wheels having handles so that the said wheels are only released by the said detents when the repeating drums are in the position for inscribing the multiplicand.

6. In a multiplying machine operating by repeated additions, the combination of wheels having handles, product indicator ciphered discs, wheels associated with such discs, idle wheels meshing with the last named wheels, and repeating drums each of which comprises a disc having fixed teeth suitable for meshing with the wheels having handles and a disc having radially movable teeth suitable for meshing with the idle wheels, the said wheels having handles and the said idle wheels being placed in such fixed planes that the repeating drums can never mesh both with the wheels having handles and with the idle wheels.

7. In a multiplying machine operating by repeated additions, the combination of repeating drums having discs having fixed teeth and axially movable, a slide movable with the said drums and having slots therein and an inclined plane, a movable detent adapted to engage between the teeth of the drum discs, an arm associated with such detent adapted to be actuated by the said inclined plane of the slide and to engage the said slots of the slide, and a spring acting on the said detent to engage the same between the teeth of the drum discs.

8. In a multiplying machine operating by repeated additions, a repeating drum comprising a disc having fixed teeth, a disc having radially movable teeth, and means for yieldingly pressing the adjacent faces of the two discs one against the other.

9. In a multiplying machine operating by repeated additions, the combination of repeating drums, a product indicator adapted to be actuated by such drums, an electric motor rotary in two opposite directions, means for transmitting the rotation of the motor to the repeating drums when such motor revolves in one direction and means for transmitting the rotation of the motor to the product indicator when the said motor revolves in the opposite direction.

10. In a multiplying machine operating by repeated additions, the combination of repeating drums, a product indicator adapted to be actuated by such drums, an indicator of totalized products, a motor rotary in two opposite directions, means for transmitting the rotation of the motor to the repeating drums when the same revolves in one direction, means for transmitting the rotation of the motor to the product indicator when the said motor revolves in the opposite direction, and means for coupling the indicator of totalized products with the product indicator.

11. In a multiplying machine operating by repeated additions, the combination of a product indicator, an indicator of totalized products, an electric motor rotary in two opposite directions, means actuated by the motor for actuating the product indicator in both directions, and means for coupling the indicator of totalized products with the product indicator when the latter is revolved in the direction for the return to zero.

12. In a multiplying machine operating by repeated additions, the combination of a motor rotary in two opposite directions, a multiplication handle movable in the vertical direction and in the horizontal direction, a yoke swinging around a horizontal spindle and having a part on which the said handle rests, a movable totalization key, a bell crank lever actuated by such totalization key, and electric contacts actuated by the said yoke and the said bell crank lever respectively and adapted to produce the forward and the backward running of the motor respectively, the said yoke and the said bell crank lever being adapted to abut against one another when the multiplication handle and the totalization key are lowered together so that the electric contacts for the forward running and those for the backward running cannot be brought at the same time to their operative position.

13. In a multiplying machine operating by repeated additions, the combination of a shaft, of repeating drums axially movable on the said shaft, a ratchet wheel secured to such shaft, a product indicator, a controlling wheel loosely mounted on the shaft, two pawls mounted on the said wheel and extending in inverse direction and means for returning to zero such product indicator comprising a ratchet wheel loosely mounted on the shaft, the said pawls engaging respectively the two said ratchet-wheels.

14. In a multiplying machine operating by repeated additions, the combination of a shaft, repeating drums and a slotted disc mounted on such shaft, an electric motor adapted to revolve the said shaft, spring pressed electric contacts adapted to supply current to such motor, a swinging yoke adapted to operate such contacts, an arm associated with such yoke and having a projection adapted to engage the slot of the said disc on the shaft of the repeating drums, and a swinging handle which freely rests on the said yoke, in such a manner that the lowering of the handle swings the yoke in closing the contact devices and in removing the said projection from the slot of the disc and that, after the raising of the handle, the current will not be cut off until the said projection drops again into the slot.

15. In a multiplying machine operating by repeated additions, the combination of a product indicator comprising a series of wheels having recesses in their hub and projections in such recesses, and a device for the return to zero, comprising a shaft slidable through the said wheels and carrying studs adapted to engage their said projections, a sleeve associated with such shaft and having a disc and a pinion thereupon, a second shaft, a finger button on such second shaft to revolve the same, a cam on the said shaft adapted to so cooperate with the disc of the sleeve as to move the first named shaft longitudinally, and a pinion on the second named shaft meshing continuously with the pinion of the first named shaft.

16. In a multiplying machine operating by repeated additions, the combination of repeating drums, a product indicator, an indicator of totalized products, both such indicators each comprising a series of wheels and devices for the passage or transfer of the tens, three parallel spindles located between the repeating drums and the wheels of the indicator of totalized products, wheels on these three spindles, the wheels of the first one always meshing with those of the product indicator, and which may be actuated by the repeating drums, the wheels of the second one of the said spindles always meshing with the wheels of the indicator of totalized products and with those of the third spindle, such third spindle being movable concentrically to the second spindle so that the wheels that it carries may alternatively come into mesh with the wheels of the first spindle or move away from the same to be enabled to be actuated by the device for passing or transferring the tens of the indicator of totalized products.

17. In a multiplying machine operating by repeated additions, the combination of repeating drums, a stoppage cam revolving in association with the repeating drums and having a slot, an electric motor, a totalization key, a bell crank lever actuated by such key, electric contacts actuated by the said lever and adapted to supply current to the motor, the bell crank lever having an arm terminating in a lip and adapted to engage the said slot of the stoppage cam to stop the rotation of the repeating drums.

18. In a multiplying machine operating by repeated additions, the combination of wheels having handles serving to inscribe the multiplicand and placed in fixed planes, wheels indicating products also placed in fixed planes, repeating drums axially movable to come and cooperate alternatively with the wheels having handles and with the wheels indicating products, means actuated by hand to move these drums axially and means actuated electrically to revolve the repeating drums.

In testimony, that I claim the foregoing as my invention I have signed my name in presence of two subscribing witnesses.

ROBERTO TAEGGI PISCICELLI.

Witnesses:
MAURICE RAUS,
H. C. COXE.